(12) United States Patent
Nakamura et al.

(10) Patent No.: US 9,234,772 B2
(45) Date of Patent: Jan. 12, 2016

(54) OPTICAL ENCODER AND APPARATUS INCLUDING THE SAME

(71) Applicant: CANON KABUSHIKI KAISHA, Tokyo (JP)

(72) Inventors: Hitoshi Nakamura, Kawasaki (JP); Chihiro Nagura, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 353 days.

(21) Appl. No.: 13/678,956

(22) Filed: Nov. 16, 2012

(65) Prior Publication Data

US 2013/0126718 A1 May 23, 2013

(30) Foreign Application Priority Data

Nov. 22, 2011 (JP) .................. 2011-255597

(51) Int. Cl.
*G01D 5/347* (2006.01)
*G01D 5/244* (2006.01)

(52) U.S. Cl.
CPC ........ *G01D 5/34707* (2013.01); *G01D 5/24438* (2013.01); *G01D 5/347* (2013.01); *G01D 5/34746* (2013.01)

(58) Field of Classification Search
CPC .............. G01D 5/347; G01D 5/34707; G01D 5/24438; G01D 5/34746
See application file for complete search history.

(56) References Cited

U.S. PATENT DOCUMENTS

| | | | |
|---|---|---|---|
| 5,068,530 A | 11/1991 | Ieki et al. | |
| 6,958,819 B1 * | 10/2005 | Heaton et al. | ............ 356/616 |
| 7,358,865 B2 | 4/2008 | Igaki et al. | |
| 8,422,025 B2 | 4/2013 | Igaki | |
| 2010/0165359 A1 | 7/2010 | Hane | |
| 2011/0001985 A1 | 1/2011 | Igaki | |

FOREIGN PATENT DOCUMENTS

| | | |
|---|---|---|
| EP | 1 477 775 A2 | 11/2004 |
| EP | 2 267 414 A2 | 12/2010 |
| JP | 03-048122 A | 3/1991 |
| JP | 2000205819 A | 7/2000 |
| JP | 2007064665 A | 3/2007 |
| JP | 2007183251 A | 7/2007 |
| JP | 2011013083 A | 1/2011 |
| JP | 2011059004 A | 3/2011 |

* cited by examiner

OTHER PUBLICATIONS

Extended European Search Report for corresponding EP 12192337.9, dated Jun. 7, 2013.

Japanese Office Action issued in counterpart application No. JP2011255597, dated Nov. 10, 2015.

*Primary Examiner* — Georgia Y Epps
*Assistant Examiner* — Don Williams
(74) *Attorney, Agent, or Firm* — Rossi, Kimms & McDowell LLP

(57) ABSTRACT

The optical encoder includes a scale provided with a periodic pattern in which an optical portion is periodically formed with a first period in a first direction, and a light receiver movable relatively with the scale in the first direction and photoelectrically converts a detection light from a light source and then passing through the optical portions. The optical portion periodically has a pattern, which is formed by pattern portions mutually adjacent in a second direction orthogonal to the first direction and mutually shifted in the first direction, in the second direction with a second period of t. A width w of the light source in the second direction satisfies $w=(a+b)/b \cdot nt$ where n represents a natural number, and a:b represents a ratio of a distance from the light source to the periodic pattern and a distance from the periodic pattern to the light receiver.

21 Claims, 7 Drawing Sheets

OPTICAL ENCODER AND APPARATUS INCLUDING THE SAME

BACKGROUND OF THE INVENTION

1. Field of the Invention

The present invention relates to an optical encoder that optically reads a periodic pattern provided on a scale to output, a signal corresponding to the periodic pattern.

2. Description of the Related Art

Optical encoders are constituted by a scale provided with a periodic pattern and a sensor movable relatively with the scale. The sensor as a light receiver photoelectrically converts a detection light emitted from a light source and then passing through optical portions that reflects or transmits the defection light to output a signal (hereinafter referred to as "a periodic signal") having a change period corresponding to the periodic pattern. Use of the periodic signal enables detection of a relative movement amount (or a relative position) of the scale and the sensor and detection of an absolute position of one of the scale and the sensor. Furthermore, interpolation of the periodic signal enables position detection with, a finer resolution than a period of the periodic pattern. The period means a spatial period or a cycle length.

However, the periodic signal contains higher-order components that are integral multiple periodic components of the period of the periodic pattern, which makes it impossible to ignore errors caused by the high-order components when number of interpolation is increased. Japanese Patent Laid-Open No. 03-048122 discloses an optical, encoder that reduces higher-order components included in a periodic signal. In this encoder, a reference pattern and another pattern having a phase shifted from that of the reference pattern toy ⅙ are provided mutually adjacently in a direction orthogonal, to a direction (hereinafter referred to as "a period direction") along the period of the periodic pattern. The encoder removes a third-order component as the higher-order component by causing a light receiver to collectively receive lights transmitted through these two patterns.

However, in general optical encoders, the scale and the sensor are attached to separate members constituting an apparatus in which the encoder is provided, and thus mechanical backlash of these members may relatively displace the scale and the sensor in a direction orthogonal to the period direction of the periodic pattern. In the encoder disclosed in Japanese Patent Laid-Open No, 03-048122, a relative displacement, of the scale and the light receiver in the direction orthogonal to the period direction changes a ratio of the above-mentioned two patterns in a detection area by the light receiver on the scale. Such change of the ratio of the two patterns results in change of a phase of a fundamental wave of the periodic signal or decrease of the higher-order component removal effect, which makes it impossible to position detection with good accuracy.

SUMMARY OF THE INVENTION

The present invention provides an optical encoder capable of performing position detection with good accuracy even if a scale and a sensor are relatively displaced in a direction orthogonal to a period direction of a periodic pattern provided on the scale.

The present invention provides as one aspect thereof an optical encoder including a scale provided with a periodic pattern in which an optical portion reflecting or transmitting light is periodically formed with a first period in a first direction, and a light receiver movable relatively with the scale in the first direction and configured to photoelectrically convert a defection light emitted from a light source and then passing through the optical portions to output a signal having a change period corresponding to the first period. When a direction orthogonal to the first direction in the periodic pattern is defined as a second direction, the optical portion periodically has a pattern, which is formed by pattern portions mutually adjacent in the second direction and mutually shifted in the first direction, in the second direction with a second period of t. A width w of the light source in the second direction satisfies the following condition:

$$w = (a+b)/b \cdot nt$$

where n represents a natural number, and a:b represents a ratio of a distance from the light source to the periodic pattern and a distance from the periodic pattern to the light receiver.

The present invention provides as another aspect thereof an optical encoder including a scale provided with a periodic pattern in which an optical portion reflecting or transmitting light is periodically formed with a first period in a first direction, and a light receiver movable relatively with the scale in the first direction and configured to photoelectrically convert a detection light emitted from a light source and then passing through the optical portions to output a signal having a change period corresponding to the first period. When a direction orthogonal, to the first direction in the periodic pattern is defined as a second direction, a proportion of the optical portion and a non-optical portion of the periodic pattern in the second direction is changed in the first direction, and the periodic pattern periodically includes a pattern, which is formed by the optical portion and the non-optical portion, in the second direction with a second period of t. A width w of the light source in the second direction satisfies the following condition:

$$w = (a+b)/b \cdot nt$$

where n represents a natural number, and a:b represents a ratio of a distance from the light source to the periodic pattern and a distance from the periodic pattern to the light receiver.

The present invention provides as still another aspect thereof an optical encoder including a scale provided with a periodic pattern in which an optical portion reflecting or transmitting light is periodically formed with a first period in a first direction, and a light receiver movable relatively with the scale in the first direction and configured to photoelectrically convert a detection light emitted from a light source and then passing through the optical portions to output a signal having a change period corresponding to the first period. When a direction orthogonal to the first direction in the periodic pattern is defined as a second direction, a proportion of the optical portion and a non-optical portion of the periodic pattern in the first direction is changed in the second direction, and the periodic pattern periodically includes a pattern, which is formed by the optical portion and the non-optical portion, in the second direction with a second period of t. A width w of the light source in the second direction satisfies the following condition:

$$w = (a+b)/b \cdot nt$$

where n represents a natural number, and a:b represents a ratio of a distance from the light source to the periodic pattern and a distance from the periodic pattern to the light receiver.

The present invention provides as yet still another aspect thereof an optical encoder including a scale provided with a periodic pattern in which an optical portion reflecting or transmitting light is periodically formed with a first period in a first direction; and a light receiver movable relatively with the scale in the first direction and configured to photoelectrically convert a detection light emitted from a light source and then passing through the optical portions to output a signal having a change period corresponding to the first period. When a direction orthogonal to the first direction in the periodic pattern is defined as a second direction, the periodic pattern periodically includes a pattern, which is formed by the optical portion and a non-optical portion, in the second direction with a second period of t. A width w of the light source in the second direction satisfies the following condition:

$$w=(a+b)/b \cdot nt$$

where n represents a natural number, and a:b represents a ratio of a distance from the light source to the periodic pattern and a distance from the periodic pattern to the light receiver.

The present invention provides as further another aspect thereof an optical encoder including a scale provided with a multiple periodic pattern including a plurality of patterns in which in each pattern an optical portions reflecting or transmitting light is periodically formed with a first period in a first direction, the first periods in the respective patterns are mutually different, and the patterns are multiply formed in a second direction orthogonal to the first direction, and a light receiver movable relatively with the scale in the first direction and configured to photoelectrically convert a detection light emitted from a light source and then passing through the optical portions to output a signal having a change period corresponding to the first period of a specific pattern among the patterns of the multiple periodic pattern. The multiple periodic pattern periodically includes a pattern, which is formed by the optical portion and a non-optical portion, in the second direction with a second period of t. A width w of the light source in the second direction satisfies the following condition:

$$w=(a+b)/b \cdot nt$$

where n represents a natural number, and a:b represents a ratio of a distance from the light source to the multiple periodic pattern and a distance from the multiple periodic pattern to the light receiver.

The present invention provides as further still another aspect thereof an optical apparatus including the above optical encoder, and a movable member whose position is detected by the optical encoder.

Further features and aspects of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
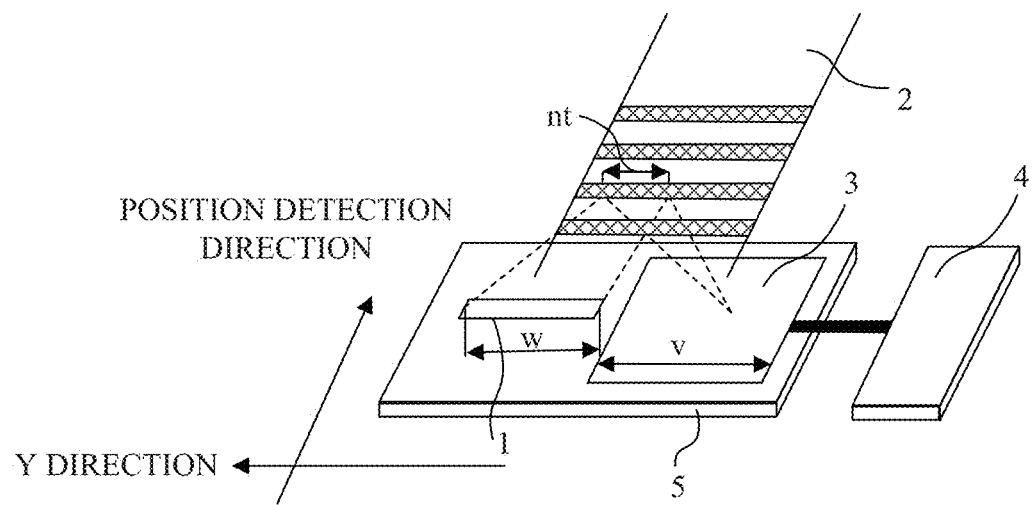
FIG. 1 is a perspective view of an optical encoder that is Embodiment 1 of the present invention.

FIG. 1 shows a configuration of an optical encoder that is a first embodiment (Embodiment 1) of the present invention. The encoder of this embodiment is a reflective optical linear encoder that is constituted by a light source 1, a scale 2, a light receiver 3 and a signal processor 4 and that detects a relative movement amount (or a relative position) of the scale 2 and the light receiver 3 or an absolute position of one of the scale 2 and the light receiver 3. In this embodiment, the light source 1 and the light receiver 3 are provided integrally in the sensor 5. Although this embodiment describes the linear encoder, alternative embodiments of the present invention include a rotary encoder configured similarly to the encoder of this embodiment.

The scale 2 is provided with, though described in detail later, a periodic pattern in which an optical portion (or a reflective portion) reflecting light and a non-optical portion (or a non-reflective portion) are alternately formed in a position detection direction shown in FIG. 1. The position detection direction corresponds to a first direction, and can be also said as a period direction of the periodic pattern. Of directions along the periodic pattern, a direction orthogonal to the position detection direction is hereinafter referred to as a Y direction that corresponds to a second direction.

The light receiver 3 is relatively movable with the scale 2 in the position detection direction. The light receiver 3 includes a photoelectric conversion element (or a light receiving element), such as a photo diode, which photoelectrical converts a detection light emitted from the light source 1 and then passing through (in other words, reflected by the reflective portion) to output a signal having a change period corresponding to a period of the periodic pattern. The signal output from the light receiver 3 is hereinafter referred to as "a periodic signal"

Figure 2:
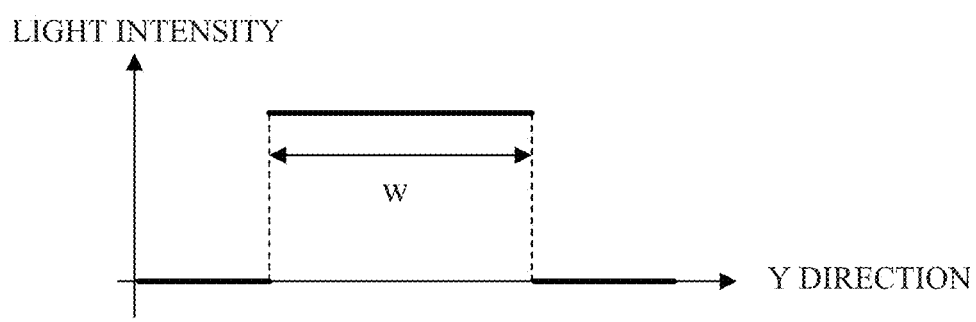
FIG. 2 shows a light intensity distribution characteristic of a light source in Embodiment 1.

The light source 1 is constituted by a light emitting element such as a current confinement structure light emitting diode (LSD), and has a rectangular light emitting surface. The light source 1 (that is, the light emitting surface) is disposed such that its long side extends in the Y direction, and has a width of w in the Y direction. The light source 1 has a light emitting characteristic that provides an approximately rectangular light intensity distribution in the Y direction as shown in FIG. 2. Other light emitting elements than the current confinement structure LED may be used as the light source 1 as long as they have a light emitting characteristic similar to that shown in FIG. 2.

Figure 3:
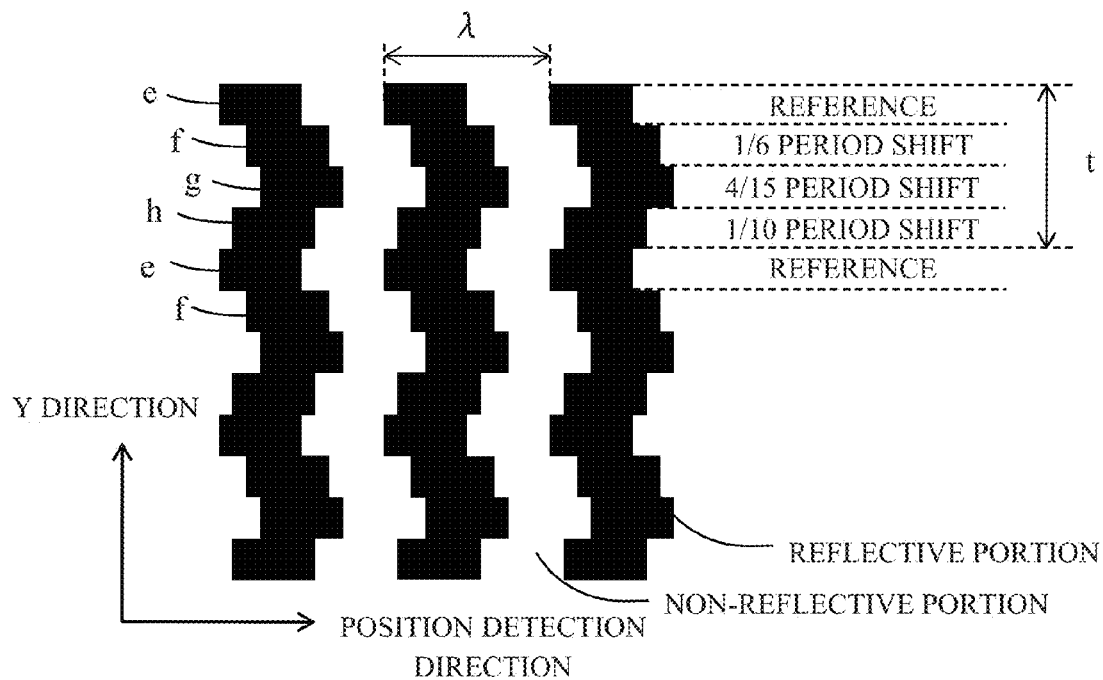
FIG. 3 shows a periodic pattern provided on a scale in Embodiment 1.

FIG. 3 shows a detailed shape of the periodic pattern provided on the scale 2. Black portions in FIG. 3 correspond to the optical portions, and are hereinafter described as "reflective portions". On the other hand, white portions in FIG. 3 correspond to the non-optical part, and are hereinafter described as "non-reflective portions".

The periodic pattern periodically includes the reflective portion with a period of λ (first period) in the position detection direction. In other words, the reflective portions are periodically arranged with the non-reflective portion therebetween with the period of λ in the position detection direction. Each reflective portion has, in the Y direction with a period of t (second period), a pattern in which plural (four in this embodiment) pattern portions mutually adjacent in the Y direction are mutually shifted in the position detection direction. Specifically, the pattern includes, in the period of t, one pattern portion e as a reference portion in the position detection direction and pattern portions f, g and h as shifted portions respectively shifted with respect to the reference portion e by ⅙, 4/15 and 1/10 of the period X of the reflective portion. In each reflective portion, this pattern in the period t is repeatedly formed multiple periods in the Y direction. In other words, the pattern portions e to h are cyclically provided such that the shifted portion h in one period t is adjacent to the reference portion e in a next period.

Such a pattern in the Y direction is provided for a purpose of mainly reducing higher-order components included in the periodic signal, output from the light receiver 3. The pattern shown in FIG. 3 has a shift amount of ⅙ of the period λ between the shifted portions e and f, and also has the same shift amount of ⅙ of the period X between the shifted portions g and h, which enables reduction of a third-order (higher-order) component. Moreover, the pattern shown in FIG. 3 has a shift amount of 1/10 of the period a between the reference portion e and the shifted portion h, and has the same shift amount of 1/10 of the period h between the shifted portions f and g, which enables reduction of a fifth order (higher-order) component.

Figure 4:
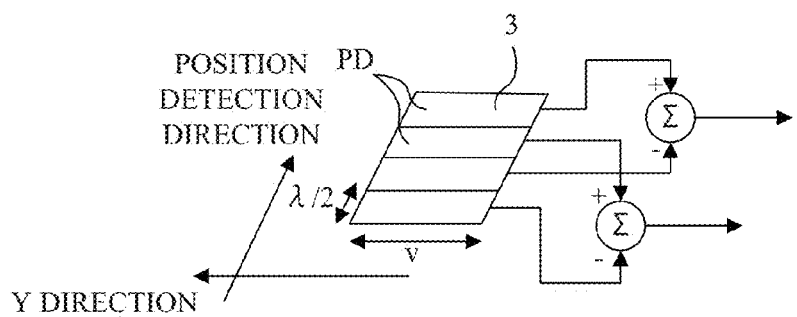
FIG. 4 shows a structure of a light receiver in Embodiment 1.

The light receiver 3 has a configuration in which, as shown in FIG. 4, four photo diodes (PDs) are arranged in the position detection direction: each PD has a rectangular shape with a width of v in the Y direction and a width of λ/2 in the position detection direction. Each PD converts a sum total amount of the detection light entering thereto to an electric signal. In this embodiment, a ratio a:b of a distance from the light source 1 to the periodic pattern on the scale 2 and a distance from the periodic pattern to the light receiver 3 is as follows:

$$a:b=1:1.$$

Therefore, an optical image of the periodic pattern projected on the light receiver 3 has a size twice the periodic pattern on the scale 2.

Accordingly, four electric signals provided from the four PDs when the scale 2 and the light receiver 3 are relatively moved in the position detection direction are a quasi sine wave signal with a reference phase (reference phase signal) and three quasi sine wave signals (phase shifted signals) respectively having phase shifts of $\Pi/2$, $\Pi$ and $3\Pi/2$ with respect to the reference phase signal. Taking difference between the reference phase signal and the phase shifted signal whose phase is shifted by $\Pi$ with respect to the reference phase and difference between the two phase shifted signals whose phases are shifted by $\Pi/2$ and $3\Pi/2$ with respect to the reference phase enables production of two phase quasi sine wave signals whose phases are shifted, with respect to each other by $\Pi/2$.

The light receiver 3 outputs, as the periodic signal, the two phase quasi sine wave signals (hereinafter referred to as "two phase signals") thus produced. The light receiver 3 outputs one period signal with a relative movement of the scale 2 and the light receiver 3 by a distance of λ in the position detection direction.

The signal processor 4 counts periods of the two phase signals output from the light receiver 3, and performs arc tangent calculation on the two phase signals to calculate a phase of the two phase signals in one period in a range from 0 to $2\Pi$. Then, the signal processor 4 calculates, from the counted number of periods and the phase in one period, the relative movement amount.

The relative movement amount d is shown by the following expression (1) where c represents the counted number of periods, p represents the phase in one period, and λ represents the period of the reflective portions of the periodic pattern:

$$d=(c+p/(2\Pi))\sqrt{\lambda} \qquad (1)$$

This embodiment has a configuration in which an optical path of the detection light reaching any one point on the light receiver 3 from the light source 1 has a width of nt (n represents a natural number) on the periodic pattern in the Y direction. This configuration keeps a component to be integrated constant even if the light source 1 (and the light receiver 3) and the scale 2 are relatively displaced in the Y direction, which makes it possible to suppress phase change of a fundamental wave of the two phase signals and reduction of a higher-order component removal effect. In this embodiment having such a configuration, the width w of the light source 1 in the Y direction satisfies a condition shown by the following expression (2):

$$w=(a+b)/b \cdot nt \qquad (2)$$

(w=2nt when a:b=1:1)

This condition shown by the expression (2) is also satisfied in other embodiment described, later.

Figure 5:
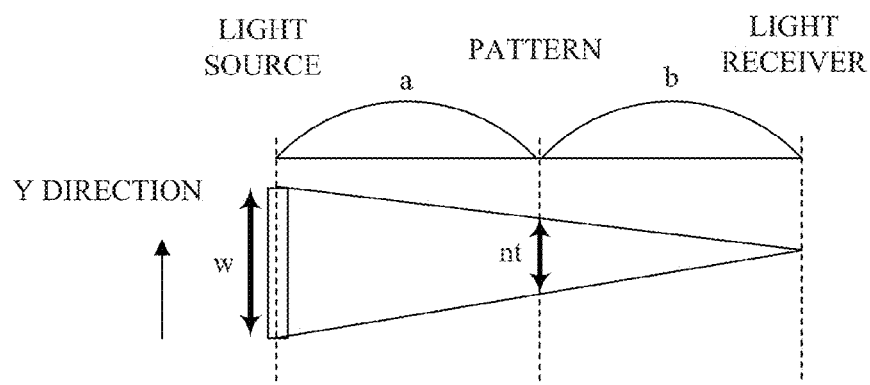
FIG. 5 shows a relative positional relationship among the light source, the scale and the light receiver in Embodiment 1.

Description will be made of the condition shown by the expression (2) with reference to FIG. 5. FIG. 5 shows a relative positional relationship among the light source 1, the periodic pattern on the scale 2 and the light receiver 3. A vertical direction in FIG. 5 corresponds to the Y direction. A triangle in FIG. 5 shows an optical path of the detection light that reaches a certain point on the light receiver 3 from the entire light source 1 (width w) in the Y direction. The ratio of the distance from the light source 1 to the periodic pattern and the distance from the periodic pattern to the light receiver 3 is a:b (for example, 1:1) as mentioned above. The triangle whose base extending in the Y direction has a length of w corresponding to the width of the light source 1 is similar to a triangle whose base has a length of nt corresponding to the width of the periodic pattern, which provides the expression (2).

In addition, in this embodiment, it is desirable that an optical path of the detection light reaching the light receiver 3 from a certain point on the light source 1 may have a width of mt (m is a natural number) on the periodic pattern of the scale 2. Such a configuration projects a periodic pattern image (optical image) corresponding to just m periods onto the light receiver 3 in the y direction. Therefore, even if the scale 2 and the light receiver 3 are relatively displaced, the component to be integrated is kept constant, which makes it possible to suppress the phase change of the fundamental wave and the reduction of the higher-order component removal effect. The width v of the light receiver 3 in the Y direction is expressed by the following expression where m represents a natural number:

$$v=(a+b)/a \cdot mt \qquad (3)$$

(v=2mf when a:b=1:1)

It is desirable that the width v satisfy the condition shown by the expression (3) in this embodiment and other embodiment described later.

Figure 6:
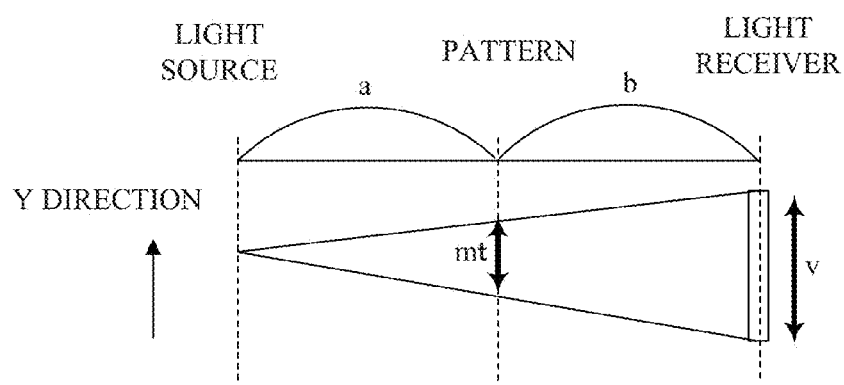
FIG. 6 shows anther relative positional relationship among the light source the scale and the light receiver in Embodiment 1.

Description will foe made of the condition of the expression (3) with reference to FIG. 6. FIG. 6 shows a relative positional relationship among the light source 1, the periodic pattern on the scale 2 and the light receiver 3. A vertical direction in FIG. 6 corresponds to the Y direction. A triangle in FIG. 6 shows an optical path of the detection light that reaches the entire light receiver 3 (width v) in the Y direction from a certain point on the light source 1. The ratio of the distance from the light source 1 to the periodic pattern and the distance from the periodic pattern to the light receiver 3 is a:b (for example, 1:1) as mentioned above. The triangle whose base extending in the Y direction has a length of v corresponding to the width of the light receiver 3 is similar to a triangle whose base has a length of mt corresponding to the width of the periodic pattern, which provides the expression (3).

In the configuration of this embodiment, if the light source 1 has an uneven light intensity distribution in the Y direction, decrease of the period t or increase of the natural number n can suppress errors.

Although this embodiment described the case where the periodic pattern includes, in one period t in the Y direction, the four pattern portions e to h mutually shifted in the position detection direction, the number of pattern portions mutually shifted in one period t is not limited to four, and any other plural number may be employed.

Moreover, although this embodiment described the case where the light receiver 3 is constituted by the four PDs, the number of PDs constituting the light receiver 3 is not limited to four. For example, the light receiver 3 may be constituted by two PDs respectively output the reference phase signal and a phase shifted signal whose phase is shifted by Π/2 with respect to that of the reference phase signal, or may be constituted by three PDs respectively output the reference phase signal and phase shifted signals whose phases are shifted by 2Π/3 and 4Π/3 with respect to that of the reference phase signal.

In addition, the light receiver 3 may be configured by arranging plural groups of two to four PDs. Using such plural FD groups enables reduction of influence of noise as compared with the ease of using only one PD group, and enables suppression of errors due to a period error of the periodic pattern or due to scarring or dirt of the scale 3.

Furthermore, the optical portion on the scale 2 is not limited to the reflective portion, and a transmissive portion transmitting light may be used as the optical portion as described later in Embodiment 3. The also applies to other embodiment (Embodiments 2, 4, 5 and 6) described later.

Embodiment 2

Figure 7:
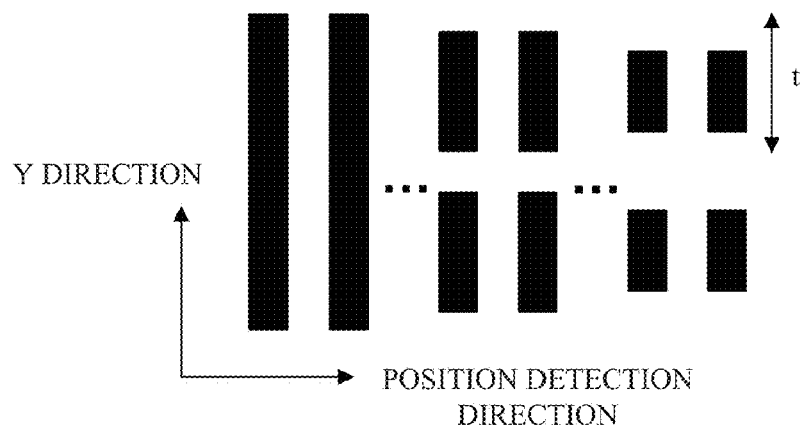
FIG. 7 shows a periodic pattern provided on a scale of an optical encoder that is Embodiment 2 of the present invention.

FIG. 7 shows a periodic pattern provided on a scale of an optical encoder that is a second embodiment (Embodiment 2) of the present invention. Although Embodiment 1 described the shape of the periodic pattern particularly corresponding to the purpose of reducing the higher-order components, this embodiment will describe a shape of the periodic pattern corresponding to a different purpose from that of Embodiment 1. A configuration of the encoder of this embodiment is same as that, of the encoder of Embodiment. 1 shown in FIG. 1 except for the periodic pattern described later.

The periodic pattern in this embodiment also includes an optical portion (or a reflective portion) reflecting light and a non-optical portion (or a non-reflective portion) that are alternately formed in a position detection direction (first direction) shown in FIG. 7. The optical portion is formed in a bar shape (thin rectangular shape) extending in a Y direction (second direction). In this embodiment, a proportion of the optical portion and the non-optical portion in the Y direction is changed in the position detection direction. In other words, lengths of the optical portion and non-optical portion in the Y direction are changed in the position detection direction. Moreover, at any position in the position detection direction, a pattern constituted by the optical portion and the non-optical portion has a period of t in the Y direction. Projecting a detection light from a light source 1 onto this periodic pattern to cause a light receiver 3 to receive the detection light reflected by the optical portions changes amplitude of signals from the light receiver 3, which enables detection of a relative movement amount of the scale 2 and the light receiver 3 by using the amplitude.

This embodiment can keep a total received light amount constant at any position in the position detection direction, and therefore can suppress change of the amplitude of the signal output from the light receiver 3 even if the scale 2 and the light receiver 3 (light source 1) are relatively displaced. Thus, regardless of the purpose, the periodic pattern including the periodically formed pattern in the Y direction can be used.

Embodiment 3

Figure 8:
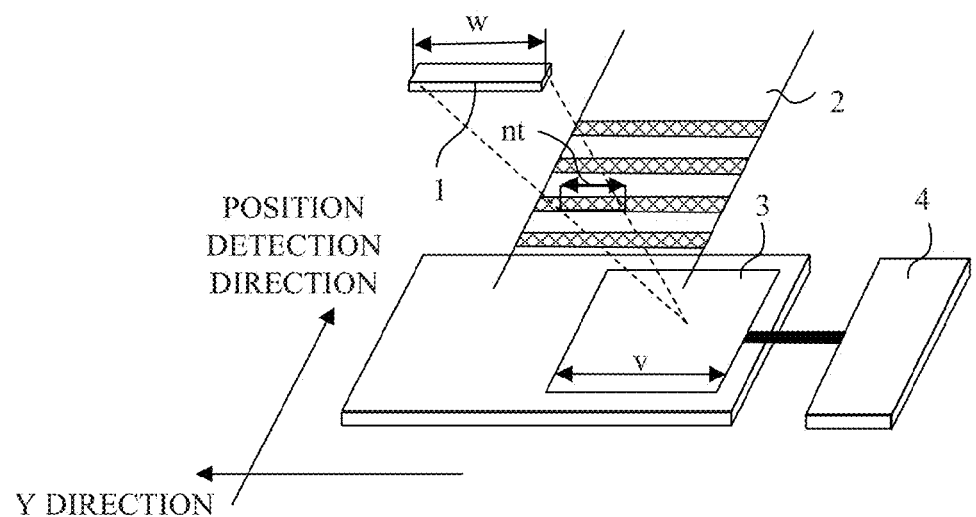
FIG. 8 is a perspective view of an optical encoder that is Embodiment 3 of the present invention.

FIG. 8 shows a configuration of an optical encoder that is a third embodiment (Embodiment 3) of the present invention.

The encoder of this embodiment is a transmissive optical linear encoder that is constituted by a light source 1, a scale 2, a light receiver 3 and a signal processor 4 and that detects a relative movement amount (or a relative position) of the scale 2 and the light receiver 3 or an absolute position of one of the scale 2 and the light receiver 3. Although this embodiment describes the linear encoder, alternative embodiments of the present invention include a rotary encoder configured similarly to the encoder of this embodiment.

In this embodiment, the scale 2 is provided with a periodic pattern in which an optical portion (or a transmissive portion) transmitting light and a non-optical portion (or a non-transmissive portion) are alternately formed in a position detection direction (first direction) shown in FIG. 8. Of directions along the periodic pattern, a direction orthogonal to the position detection direction is referred to as a Y direction (second direction), as well as in Embodiment 1. The periodic pattern in this embodiment has a same shape as that shown in FIG. 3 in Embodiment 1.

The light receiver 3 is relatively movable with the scale 2 in the position detection direction. The light receiver 3 photo-electrically converts a detection light emitted from the light source 1 disposed on a side opposite to the light receiver 3 with respect to the scale 2 and then passing through the optical portion (in other words, transmitted through the transmissive portion) to output a periodic signal having a change period corresponding to a period of the periodic pattern.

As mentioned in Embodiment 1, this embodiment also satisfies the condition of the expression (2) described in Embodiment 1. Moreover, it is desirable that this embodiment satisfy the condition of the expression (3) described in Embodiment 1.

Also in this embodiment, as well as in Embodiment 1, even if the light source 1, the scale 2 and the light receiver 3 are relatively displaced in the Y direction, the relative positional relationships shown in FIGS. 5 and 6 are maintained. Therefore, this embodiment provides same effects as those of Embodiment 1.

Embodiment 4

Figure 9:
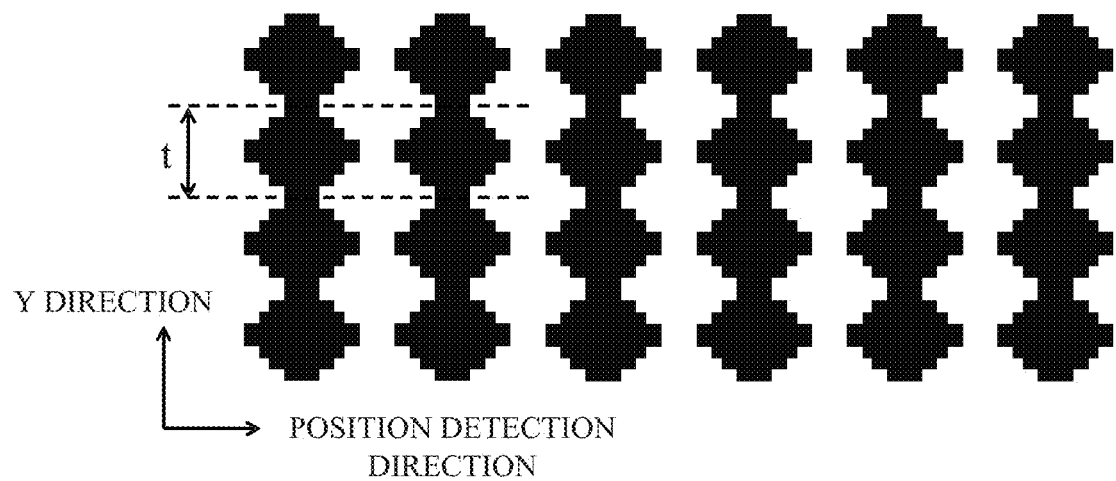
FIG. 9 shows a periodic pattern provided on a scale of an optical encoder that is Embodiment 4 of the present invention.

FIG. 9 shows a periodic pattern provided on a scale of an optical encoder that is a fourth embodiment (Embodiment 4) of the present invention. This embodiment has, as well as Embodiment 1, a shape of the periodic pattern corresponding to the purpose of reducing the higher-order components. A configuration of the encoder of this embodiment is same as that of the encoder of Embodiment 1 shown in FIG. 1 except for the periodic pattern described later.

The periodic pattern in this embodiment also includes an optical portion (or a reflective portion) reflecting light and a non-optical portion (or a non-reflective portion) that are alternately formed in a position detection direction (first direction) shown in FIG. 9. In this embodiment, a proportion (duty ratio) of the optical portion and the non-optical portion in the position defection direction is changed in a Y direction (second direction). The proportion can be arbitrarily decided according to a target higher-order component to be reduced. For example, in order to reduce the third- and fifth-order components, as well as in Embodiment 1, it is desirable that the proportion of the optical portion to the non-optical portion in the position defection direction be changed to 7λ/30, 13λ/30, 17λ/30 and 23λ/30 as shown in FIG. 10.

Figure 10:
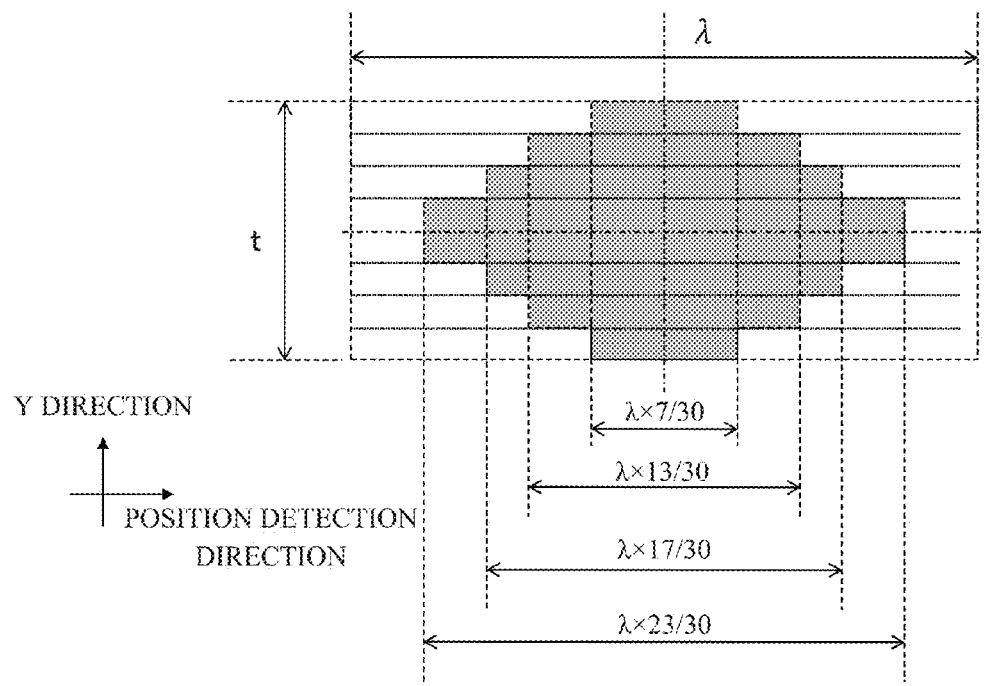
FIG. 10 shows a periodic pattern provided on a scale of an optical encoder that is Embodiment 4 of the present invention.

Although FIG. 10 shows a pattern whose proportion (duty ratio) of the optical portion and the non-optical portion is 1:1, changing this ratio makes it possible to arbitrarily change the proportion.

Also in this embodiment, as well as in Embodiments 1 to 3, the pattern constituted by the optical portion and the non-optical portion is formed with a period of t in the Y direction.

Thus, even if the light source 1, the scale 2 and the light receiver 3 are relatively displaced in the Y direction, this embodiment provides same effects as those in Embodiment 1.

Embodiment 5

Figure 11:
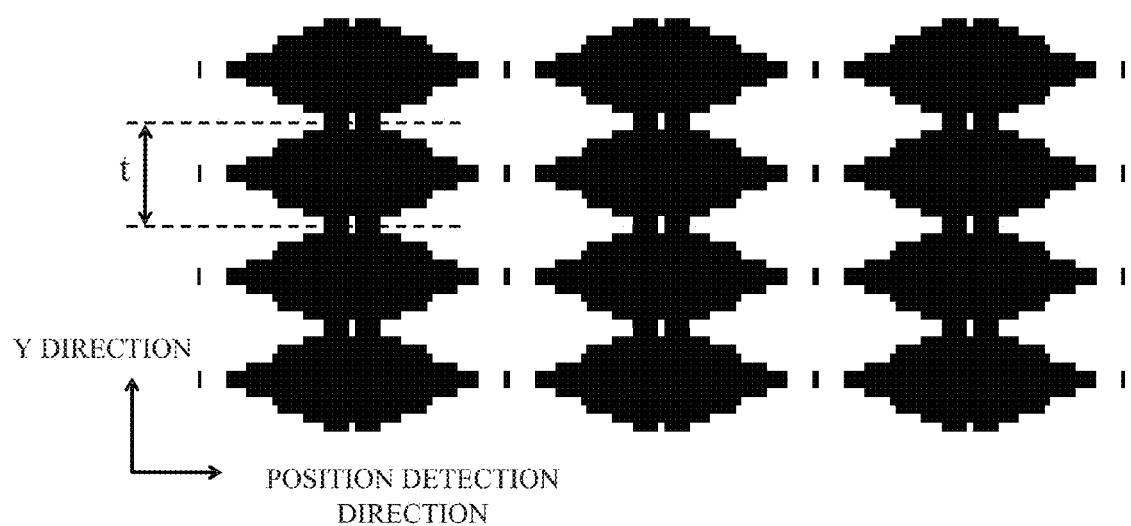
FIG. 11 shows a periodic pattern provided on a scale of an optical encoder that is Embodiment 5 of the present invention.

FIG. 11 shows a periodic pattern provided on a scale of an optical encoder that is a fifth embodiment of the present invention. This embodiment has, as well as Embodiments 1 and 4, a shape of the periodic pattern corresponding to the purpose of reducing the higher-order components. A configuration of the encoder of this embodiment is same as that of the encoder of Embodiment 1 shown in FIG. 1 except for the periodic pattern described later.

The periodic pattern in this embodiment also includes an optical portion (or a reflective portion) reflecting light and a non-optical portion (or a non-reflective portion) that are alternately formed in a position detection direction (first direction) shown in FIG. 11. Furthermore, also in a Y direction (second direction), a pattern constituted by the optical-portion and the non-optical portion is periodically changed.

Figure 12:
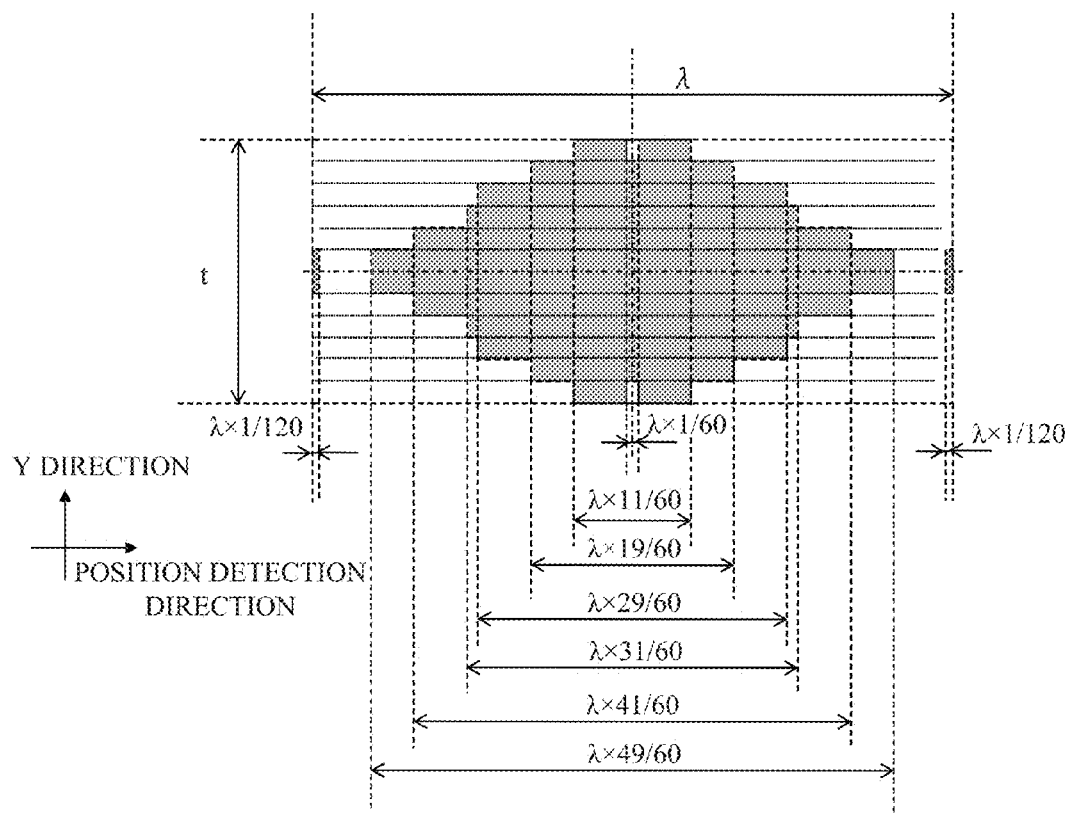
FIG. 12 shows part of the periodic pattern in Embodiment 5.

The higher-order components included in signals produced by photoelectric conversion in a light receiver 3 are changed according to combination of a light intensity distribution of a light source 1, a shape of the periodic pattern of the scale 2, a shape of the light receiver 3, arrangement and characteristics of light receiving elements constituting the light receiver 3, and a distance relationship among the light source 1, the scale 2 and the light receiver 3. Thus, this embodiment periodically provides a pattern shown in FIG. 12 to reduce second-, third-, fifth- and seventh-order components when a distance from the light source 1 to the scale 2 and a distance from the scale 2 to the light receiver 3 are about 1 mm.

Also in this embodiment, as well as in Embodiments 1 to 4, the pattern constituted by the optical portion and the non-optical portion is formed with a period of t in the Y direction. Thus, even if the light source 1, the scale 2 and the light receiver 3 are relatively displaced in the Y direction, this embodiment provides same effects as those in Embodiment 1.

Embodiment 6

Figure 13:
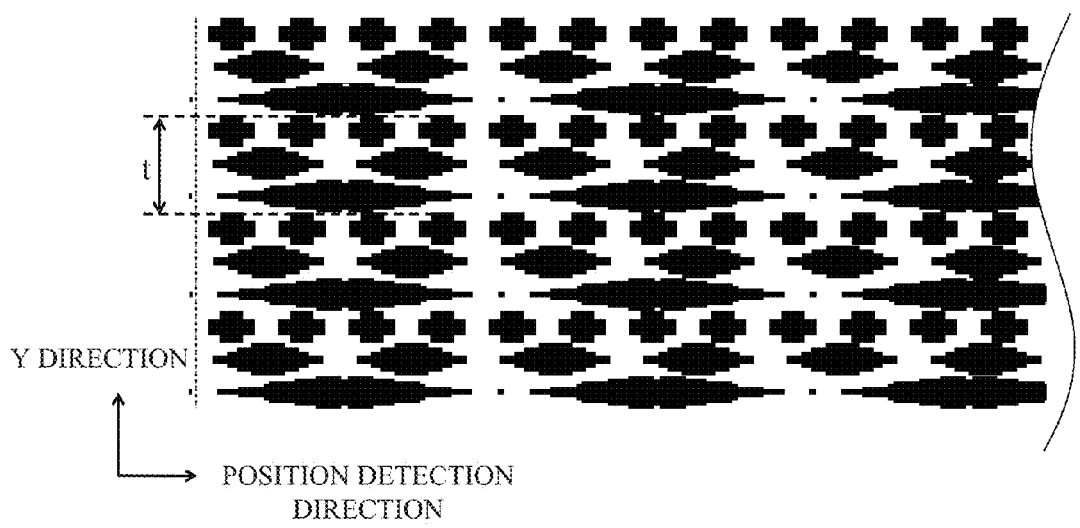
FIG. 13 shows a periodic pattern provided on a scale of an optical encoder that is Embodiment 6 of the present invention.

FIG. 13 shows a periodic pattern provided on a scale of an optical encoder that is a sixth embodiment of the present invention. This embodiment has a multiple periodic pattern in which plural patterns having mutually different periods and respectively having shapes corresponding to a purpose of reducing higher-order components are multiply formed in a Y direction (second direction). A configuration of the encoder of this embodiment is same as that of the encoder of Embodiment 1 shown in FIG. 1 except for the periodic pattern described later.

Each pattern constituting the multiple periodic pattern in this embodiment also includes an optical portion (or a reflective portion) reflecting light and a non-optical portion (or a non-reflective portion) that are alternately formed in a position detection direction (first direction) shown in FIG. 13. In this embodiment, a signal processor 4 can detect a signal having a change period corresponding to a period of a specific one (in other words, arbitrarily selected one) of the plural patterns constituting the multiple periodic pattern.

Also in this embodiment, as well as in Embodiments 1 to 5, the pattern constituted by the optical portion and the non-optical portion is formed with a period of t in the Y direction. Thus, even if the light source 1, the scale 2 and the light receiver 3 are relatively displaced in the Y direction, this embodiment provides same effects as those in Embodiment 1.

Embodiment 7

Figure 14:
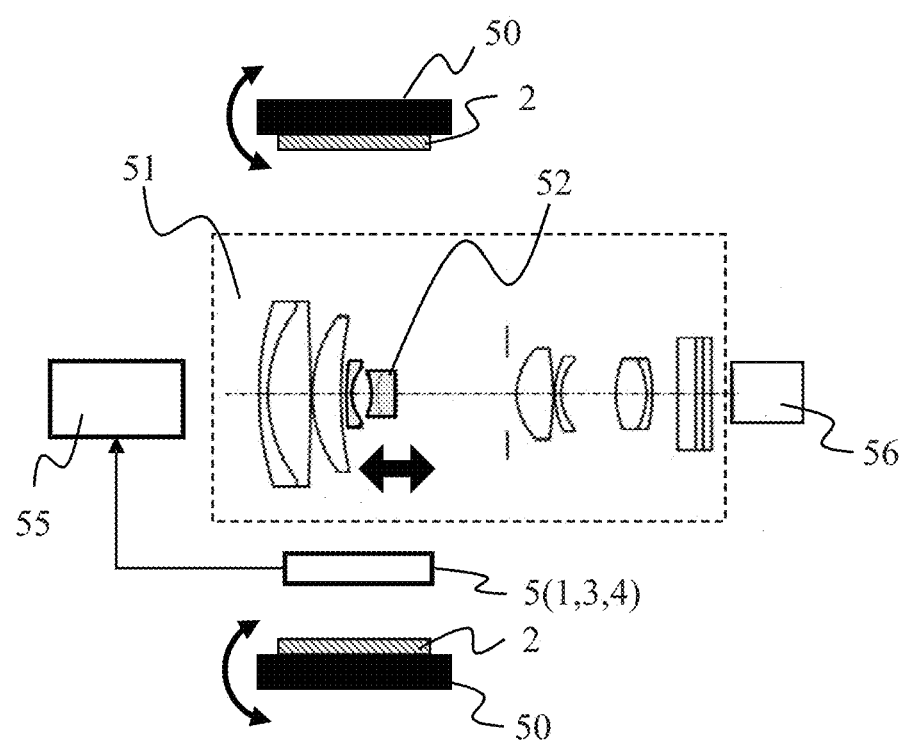
FIG. 14 shows a configuration of an image pickup apparatus that is Embodiment 7 of the present invention.

FIG. 14 shows, as an example of apparatus including the optical encoder described in Embodiment 1, an image pickup apparatus (optical apparatus) such as a digital still, camera or a video camera. This image pickup apparatus uses the optical encoder for detecting position of a movable lens in a lens barrel of the image pickup apparatus. In this embodiment, any one of the encoders described in Embodiments 2 to 6 may be used in place of the optical encoder of Embodiment 1.

In FIG. 14, reference numeral 2 denotes a scale, 5 a sensor (a light source 1 and a light receiver 3), and 4 a signal processor. The scale 2, the sensor 5 and the signal processor 4 constitute the optical encoder. The scale 2 is attached to an inner surface of a cam ring 50 as a movable cylindrical member rotatable about an optical axis of an image capturing optical system (described later) housed in the lens barrel. The cam ring 50 is driven to foe rotated by an actuator (not shown).

The lens barrel houses thereinside the image capturing optical system 51. The image capturing optical system 51 includes the above-mentioned movable lens, such as a magnification-varying lens or a focus lens, movable in a direction in which the optical axis extends. The movable lens is moved by a cam formed in the cam ring 50 when the cam ring 50 is rotated.

Reference numeral 55 denotes a CPU that controls an entire system of the image pickup apparatus. Reference numeral 56 denotes an image sensor (image pickup element) that photoelectrically converts an object image formed by the image capturing optical system 51. The image sensor 56 is constituted by a photoelectric conversion element such as a CCD sensor or a CMOS sensor.

When the cam ring 50 is rotated for moving the movable lens 52, the encoder detects rotation position of the cam ring 50 (that is, position of the movable lens in the optical axis direction) to output position information on the rotation position to the CPU 24.

The CPU 24 drives the actuator to rotate the cam ring 50 on a basis of the position information to move the movable lens 52 to its target position.

The encoders described in Embodiments 1 to 6 can be used not only in the above-described image pickup apparatus for the detection of the movable lens, but also for position detection of a print head or a paper feed roller provided in a printer (optical apparatus), rotational position detection of a photo-sensitive drum of a copier (optical apparatus), position detection of a robot arm and position defection in other various apparatuses.

Each embodiment described above is merely a typical example, and it various transforms and it can change for each embodiment before the execution of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-255597, filed, on Nov. 22, 2011 which is hereby incorporated by reference herein in its entirety.

What is claimed is:
1. An optical encoder comprising;
   a scale provided with a periodic pattern in which an optical portion reflecting or transmitting light is periodically formed with a first period in a first direction; and
   a light receiver configured to photoelectrically convert a detection light emitted from a light source and then passing via the scale into an output signal having a change period corresponding to the first period,
   wherein the scale and the light receiver are relatively movable in the first direction,
   wherein the optical portion is configured to direct the light from the light source to the light receiver, wherein, when a direction orthogonal to the first direction in the periodic pattern is defined as a second direction, the optical portion periodically has a pattern, which is formed pattern portions mutually adjacent in the second direction and mutually shifted in the first direction, in the second direction with a second period of t, and wherein a width w of the light source in the second direction satisfies the following condition:

$$w=(a+b)/b \cdot nt$$

where n represents a natural number, and a:b represents a ratio of a distance from the light source to the periodic pattern and a distance from the periodic pattern to the light receiver.

2. An optical encoder according to claim 1, wherein a width v of the light receiver in the second direction satisfies the following condition:

$$v=(a+b)/a \cdot mt$$

where m represents a natural number.

3. An optical apparatus comprising:
an optical encoder according to claim 1; and
a movable member whose position is detected by the optical encoder.

4. An optical encoder comprising;
a scale provided with a periodic pattern in which an optical portion reflecting or transmitting light is periodically formed with a first period in a first direction; and
a light receiver configured to photoelectrically convert a detection light emitted from a light source and then passing via the scale into an output signal having a change period corresponding to the first period,
wherein the scale and the light receiver are relatively movable in the first direction,
wherein the optical portion is configured to direct the light from the light source to the light receiver,
wherein, when a direction orthogonal to the first direction in the periodic pattern is defined as a second direction, a proportion of the optical portion and a non-optical portion of the periodic pattern in the second direction is changed in the first direction, and the periodic pattern periodically includes a pattern, which is formed by the optical portion and the non-optical portion, in the second direction with a second period of t, and
wherein a width w of the light source in the second direction satisfies the following condition:

$$w=(a+b)/b \cdot nt$$

where n represents a natural number, and a:b represents a ratio of a distance from the light source to the periodic pattern and a distance from the periodic pattern to the light receiver.

5. An optical encoder according to claim 3, wherein a width v of the light receiver in the second direction satisfies the following condition:

$$v=(a+b)/a \cdot mt$$

where m represents a natural number.

6. An optical apparatus comprising;
an optical encoder according to claim 4; and
a movable member whose position is detected by the optical encoder.

7. An optical encoder comprising:
a scale provided with a periodic pattern in which an optical portion reflecting or transmitting light is periodically formed with a first period in a first direction; and
a light receiver configured to photoelectrically convert a detection light emitted from a light source and then passing via the scale into an output signal having a change period corresponding to the first period,
wherein the scale and the light receiver are relatively movable in the first direction,
wherein the optical portion is configured to direct the light from the light source to the light receiver,
wherein, when a direction orthogonal to the first direction in the periodic pattern is defined as a second direction, a proportion of the optical portion and a non-optical portion of the periodic pattern in the first direction is changed in the second direction, and the periodic pattern periodically includes a pattern, which is formed by the optical portion and the non-optical portion, in the second direction with a second period of t, and
wherein a width w of the light source in the second direction satisfies the following condition:

$$w=(a+b)/b \cdot nt$$

where n represents a natural number, and a:b represents a ratio of a distance from, the light source to the periodic pattern and a distance from the periodic pattern to the light receiver.

8. An optical encoder according to claim 7, wherein a width v of the light receiver in the second direction satisfies the following condition:

$$v=(a+b)/a \cdot mt$$

where m represents a natural number.

9. An optical apparatus comprising:
an optical encoder according to claim 7; and
a movable member whose position is detected by the optical encoder.

10. An optical encoder comprising:
a scale provided with a periodic pattern in which an optical portion reflecting or transmitting light is periodically formed with a first period in a first direction; and
a light receiver configured to photoelectrically convert a detection light emitted from a light source and then passing via the scale into an output signal having a change period corresponding to the first period,
wherein the scale and the light receiver are relatively movable in the first direction,
wherein the optical portion is configured to direct the light from the light source to the light receiver,
wherein, when a direction orthogonal to the first direction in the periodic pattern is defined as a second direction, the periodic pattern periodically includes a pattern, which is formed by the optical portion and a non-optical portion, in the second direction with a second period of t, and
wherein a width w of the light source in the second direction satisfies the following condition:

$$w=(a+b)/b \cdot nt$$

where n represents a natural number, and a:b represents a ratio of a distance from the light source to the periodic pattern and a distance from the periodic pattern to the light receiver.

11. An optical, encoder according to claim 10, wherein a width v of the light receiver in the second direction satisfies the following condition:

$$w=(a+b)/b \cdot nt$$

where m represents a natural number.

12. An optical apparatus comprising:
an optical encoder according to claim 10; and
a movable member whose position is detected, by the optical encoder.

13. An optical encoder comprising:
a scale provided with a multiple periodic pattern including a plurality of patterns in which (a) in each pattern an optical portions reflecting or transmitting light is periodically formed with a first period in a first direction, (b) the first periods in the respective patterns are mutually different, and (c) the patterns are multiply formed in a second direction orthogonal to the first direction; and
a light receiver configured to photoelectrically convert a detection light emitted from a light source and then passing via the scale into an output signal having a change period corresponding to the first period of a specific pattern among the patterns of the multiple periodic pattern, wherein the scale and the light receiver and relatively movable in the first direction, wherein the optical portion is configured to direct the light from the light source to the light receiver, wherein the multiple periodic pattern periodically includes a pattern, which is formed by the optical portion and a non-optical portion, in the second direction with a second period of t, and wherein a width w of the light source in the second direction satisfies the following condition:

$$w=(a+b)/b \cdot nt$$

where n represents a natural number, and a/b represents a ratio of a distance from the light source to the multiple periodic pattern and a distance from the multiple periodic pattern to the light receiver.

14. An optical encoder according to claim 13, wherein a width v of the light receiver in the second direction satisfies the following condition:

$$v=(a+b)/a \cdot mt$$

where m represents a natural number.

15. An optical apparatus comprising:
an optical encoder according to claim 13; and
a movable member whose position is detected by the optical encoder.

16. An optical encoder comprising:
a scale provided with a multiple periodic pattern including a plurality of patterns in which (a) in each pattern an optical portions reflecting or transmitting light is periodically formed with a first period in a first direction, (b) the first periods in the respective patterns are mutually different, and (c) the patterns are multiply formed in a second direction orthogonal to the first direction; and
a light receiver configured to photoelectrically convert a detection light emitted from a light source and then passing via the scale into an output signal having a change period corresponding to the first period of a specific pattern among the patterns of the multiple periodic pattern,
wherein the scale and the light receiver are relatively movable in the first direction,
wherein the optical portion is configured to direct the light from the light source to the light receiver,
wherein the multiple periodic pattern periodically includes a pattern, which is formed by the optical portion and a non-optical portion, in the second direction with a second period of t, and
wherein when w represents a width of the light source in the second direction and a:b represents a ratio of a distance from the light source to the periodic pattern and a distance from the periodic pattern to the light receiver, the scale is configured so that the second period t takes on a value based on the width w and the ratio a:b.

17. An optical encoder according to claim 16, wherein the light receiver is configured so that a width v of the light receiver in the second direction takes on a value based on the second period t and the ratio a:b.

18. An optical apparatus comprising:
an optical encoder; and
a movable member whose position is detected by the optical encoder,
wherein the optical encoder comprises:
a scale provided with a periodic pattern in which an optical portion reflecting or transmitting light is periodically formed with a first period in a first direction; and
a light receiver configured to photoelectrically convert a detection light emitted from a light source and then passing via the scale into an output signal having a change period corresponding to the first period,
wherein the scale and the light receiver are relatively movable in the first direction,
wherein the optical portion is configured to direct the light from the light source to the light receiver,
wherein, when a direction orthogonal to the first direction in the periodic pattern is defined as a second direction, a proportion of the optical portion and a non-optical portion of the periodic pattern in the second direction is changed in the first direction, and the periodic pattern periodically includes a pattern, which is formed by the optical portion and the non-optical portion, in the second direction with a second period of t, and
wherein when w represents a width of the light source in the second direction and a:b represents a ratio of a distance from the light source to the periodic pattern and a distance from the periodic pattern to the light receiver, the scale is configured so that the second period t takes on a value based on the width w and the ratio a:b.

19. An optical encoder comprising:
a scale provided with a periodic pattern in which an optical portion reflecting or transmitting light is periodically formed with a first period in a first direction; and
a light receiver configured to photoelectrically convert a detection light emitted from a light source and then passing via the scale into an output signal having change period corresponding to the first period,
wherein the scale and the light receiver are relatively movable in the first direction,
wherein the optical portion is configured to direct the light from the light source to the light receiver,
wherein, when a direction orthogonal to the first direction in the periodic pattern is defined as a second direction, a proportion of the optical portion and a non-optical portion of the periodic pattern in first direction is changed in the second direction, and the periodic pattern periodically includes a pattern, which is formed by the optical portion and the non-optical portion, in the second direction with a second of t, and
wherein when w represents a width of the light source in the second direction and a:b represents a ratio of a distance from the light source to the periodic pattern and a distance from the periodic pattern to the light receiver, the scale is configured so that the second period t takes on a value based on the width w and the ratio a:b.

20. An optical encoder according to claim 19, wherein the light receiver is configured so that a width v of the light receiver in the second direction takes on a value based on the second period t and the ratio a:b.

21. An optical apparatus comprising:
an optical encoder; and
a movable member whose position is detected by the optical encoder,
wherein the optical encoder comprises:
a scale provided with a periodic pattern in which an optical portion reflecting or transmitting light is periodically formed with a first period in a first direction; and
a light receiver configured to photoelectrically convert a detection light emitted from a light source and then passing via the scale into an output signal having a change period corresponding to the first period,
wherein the scale and the light receiver are relatively movable in the first direction,
wherein the optical portion is configured to direct the light from the light source to the light receiver,
wherein, when a direction orthogonal to the first direction in the periodic pattern is defined as a second direction, a proportion of the optical portion and a non-optical portion of the periodic pattern in the first direction is changed in the second direction, and the periodic pattern periodically includes a pattern, which is formed by the optical portion and the non-optical portion, in the second direction with a second period of t, and wherein when w represents a width of the light source in the second direction and a:b represents a ratio of a distance from the light source to the periodic pattern and a distance from the periodic pattern to the light receiver, the scale is configured so that the second period t takes on a value based on the width w and the ratio a:b.

* * * * *